United States Patent [19]

Goss et al.

[11] Patent Number: 4,526,312
[45] Date of Patent: Jul. 2, 1985

[54] LOW COST METHOD OF MAKING SUPERPLASTICALLY FORMED AND DIFFUSION BONDED STRUCTURES

[75] Inventors: Joseph R. Goss, Huntington Beach; David W. Schulz, Hermosa Beach, both of Calif.

[73] Assignee: Rockwell International Corporation, El Segundo, Calif.

[21] Appl. No.: 102,091

[22] Filed: Dec. 10, 1979

[51] Int. Cl.³ .............................................. B23K 31/02
[52] U.S. Cl. .................................................... 228/157
[58] Field of Search ..................... 228/157; 164/34, 35

[56] References Cited

U.S. PATENT DOCUMENTS

| | | | |
|---|---|---|---|
| 3,196,506 | 7/1965 | Operhall et al. | 164/35 |
| 3,206,810 | 9/1965 | Hockin et al. | 164/34 |
| 3,422,880 | 1/1969 | Brown et al. | 164/34 |
| 3,927,817 | 12/1975 | Hamilton et al. | 228/157 |
| 4,154,282 | 5/1979 | Kull | 164/34 |

*Primary Examiner*—John McQuade
*Attorney, Agent, or Firm*—Charles T. Silberberg

[57] ABSTRACT

A method of making metallic sandwich structures is disclosed using a plurality of metal blank workpieces with at least one of the blank workpieces capable of being superplastically formed against a surface of a die. At least one of the blanks is treated at selective areas to prevent bonding in those areas. The blanks are positioned in a stack with at least one of the outer workpieces of the stack having the capacity to be superplastically formed. The stack is then diffusion bonded together in the untreated areas. At least one insert, preferably made from wax, is coupled to the bonded stack such that the external configuration of the at least one insert and bonded stack conform to the external configuration of the sandwich structure. A mold is cast around the at least one insert and bonded stack, after which the at least one insert is removed from the mold. Thereafter, the bonded stack is superplastically formed within the cast mold, resulting in the desired sandwich structure. In a second embodiment, wherein the metallic structure has a curvature, the stack may be either formed to the curvature of the sandwich structure and then diffusion bonded or simultaneously formed to the curvature of the sandwich structure and diffusion bonded in the untreated areas of the blanks. Thereafter, at least one insert is coupled to the curved and diffusion bonded stack, such that the combination has the external configuration of the sandwich structure to be formed. A mold is then cast about the curved and bonded stack and the at least one insert, after which the insert is removed from the mold. The curved and bonded stack is then superplastically formed in the cast mold to sandwich structure.

15 Claims, 10 Drawing Figures

LOW COST METHOD OF MAKING SUPERPLASTICALLY FORMED AND DIFFUSION BONDED STRUCTURES

BACKGROUND OF INVENTION

A. Field of the Invention

The invention relates to the field of metal forming, and particularly to a method of making metallic sandwich structures by superplastic forming and diffusion bonding.

B. Description of Prior Art

It has been known for many years that certain metals, such as titanium, and other alloys, exhibit superplasticity. Superplasticity is the capability of a material to develop unusually high tensile elongations with a reduced tendency toward necking. This capability is exhibited by only a limited number of metals and alloys, and within limited temperature and strain rate ranges. For example some titanium alloys, such as Ti-6Al-4V, have been observed to exhibit superplastic characteristics.

Until the advent of viable superplastic forming techniques, taking advantage of this property to form complex configurations requiring large tensile elongations was extremely difficult or, in some instances, not possible. A significant breakthrough in superplastic forming was made by Hamilton, et al., disclosed in U.S. Pat. No. 3,934,441, Controlled Environment Superplastic Forming, incorporated into this specification herewith by reference. Simplified, the process involves placing a worksheet or blank over a cavity in a chamber. The blank is heated to a temperature where it exhibits superplastic characteristics after which pressure is applied to the blank, causing it to stretch and form into the cavity.

Diffusion bonding refers to the metallurgical joining of surfaces of similar or dissimilar metals by applying heat and pressure for a sufficient time so as to cause co-mingling of the atoms at the joint interface. Diffusion bonding is accomplished entirely in the solid state at or above one-half the base metal melting point. Actual times, temperatures and pressures will vary from metal to metal.

The combining of superplastic forming and diffusion bonding (SPF/DB) in the making of metallic sandwich structures has been successfully accomplished and is disclosed in U.S. Pat. No. 3,927,817, Method of Making Metallic Sandwich Structures, by Hamilton, et al., and is herein also incorporated by reference.

Basically, the Hamilton, et al. method for making metallic sandwich structure involves fabricating the structures from a plurality of metal blank workpieces. One or more of the blanks are coated in selected areas not to be diffusion bonded. The blanks are positioned in a stacked relationship and placed in a die assembly. The stack is diffusion bonded together in the uncoated areas by the application of pressure, and at least one of the blanks is superplastically formed against one or more of the die surfaces forming the sandwich structure. The core configuration is determined by the location, size, and shape of the joined areas.

This process requires a die which is typically machined from material that has high strength at the elevated temperatures involved in superplastic forming. While such dies are cost effective when used on large production runs, the cost of manufacturing such dies for use in producing prototype structures or on small production runs may be uneconomical.

It is therefore a primary object of the present invention to combine the processes of superplastic forming and diffusion bonding to form prototype on small production runs of metal sandwich structures.

It is another object of the present invention to provide a low-cost method of making prototype and limited production run metal sandwich structures.

It is yet another object of the present invention to provide a low-cost method of making dies for use in superplastic forming and diffusion bonding of structures by utilizing the lost wax investment mold process.

SUMMARY OF THE INVENTION

The invention is a method of making metallic sandwich structures using a plurality of metal blank workpieces, with at least one of the blanks capable of being superplastically formed against a surface of a die. At least one of the blanks is treated at selected areas with a stop-off compound to prevent bonding in those areas. The blanks are positioned in a stack, with at least one of the outer blanks of the stack having the capacity to be superplastically formed, and diffusion bonded together in the untreated areas. At least one insert is coupled to the bonded stack so that the combination has the external configuration of the sandwich structure. This is preferably accomplished by enclosing the bonded stack in an inexpensive mold having an internal cavity complimentary to the external configuration of the sandwich structure to be formed. Liquified wax is injected into the cavity and allowed to solidify forming the at least one insert. The mold is then removed from about the bonded stack and the at least one insert. A ceramic mold is cast about the at least one insert and bonded stack after which the at least one insert is liquified and removed from the mold. Thereafter, the bonded stack is superplastically formed into the cast mold, resulting in the formed sandwich structure.

In a second embodiment, wherein the sandwich structure has a curvature, the method is modified. The stack is placed in a mold and simultaneously or sequentially formed to the curvature of the sandwich structure and diffusion bonded in the untreated areas of the blanks. Thereafter, the at least one insert is coupled to the curved and bonded stack by the method previously discussed. A mold is then formed about the curved and bonded stack and the at least one insert, after which the at least one insert is removed from the cast mold. The curved and diffusion bonded stack is then superplastically formed into the sandwich structure.

The novel features which are believed to be characteristic of the invention, both as to its organization and its method of operation, together with further objects and advantages thereof, will be better understood from the following description in connection with the accompanying drawings in which presently preferred embodiments are illustrated by way of examples. It is expressly to be understood, however, that the drawings are for purposes of illustration and description only, and are not intended as a definition of the limits of the invention.

BRIEF DESCRIPTION OF THE DRAWINGS

Illustrated in FIG. 1 is an exploded perspective view of a three-piece metal blank stack to be formed into a sandwich structure.

Illustrated in FIG. 2 is a cross-sectional view of the three blanks shown in FIG. 1 stacked together.

Figure 3:
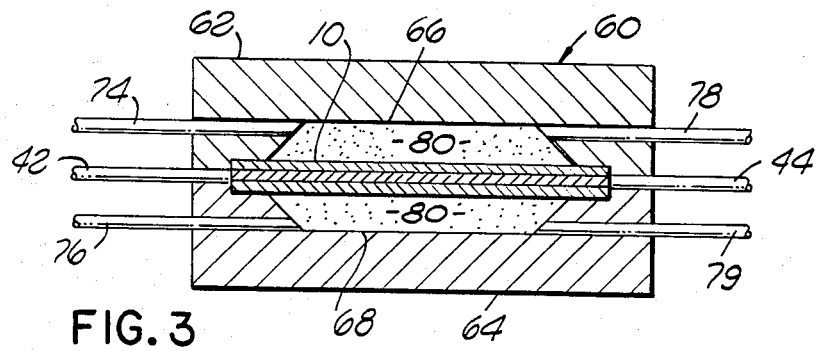

Illustrated in FIG. 3 is a cross-sectional view of the stack installed in a mold in which wax has been injected.

Figure 4:
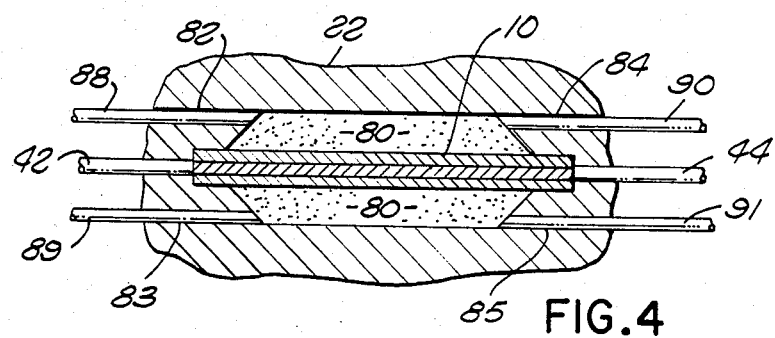

Illustrated in FIG. 4 is a cross-sectional view of the stack and inserts within a cast mold.

Figure 5:
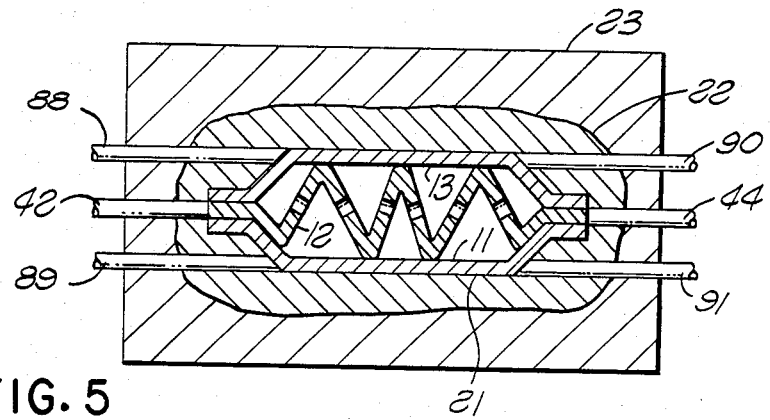

Illustrated in FIG. 5 is a cross-sectional view of the cast mold shown in FIG. 4, with reinforcing structure cast there about with the formed metallic sandwich structure therein.

Figure 6:
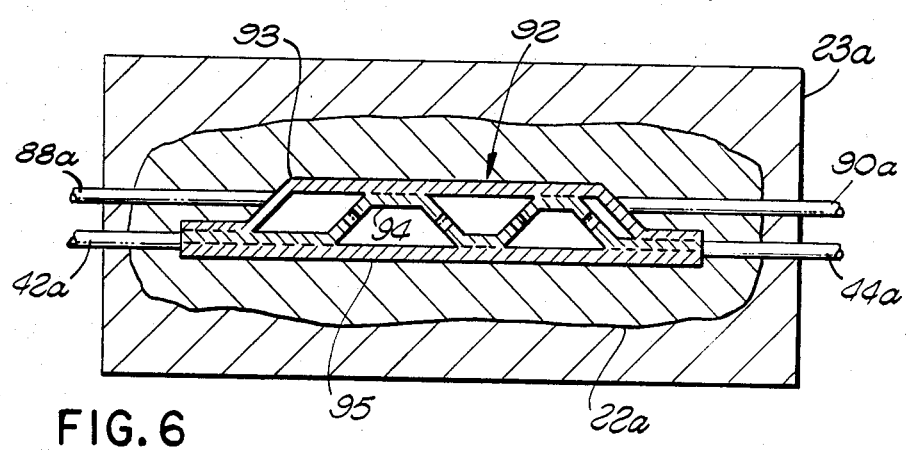

Illustrated in FIG. 6 is a cross-sectional view of an alternate configuration of a metallic sandwich structure, having only one outer surface and the core superplastically formed, enclosed within a reinforced cast mold.

Figure 7:
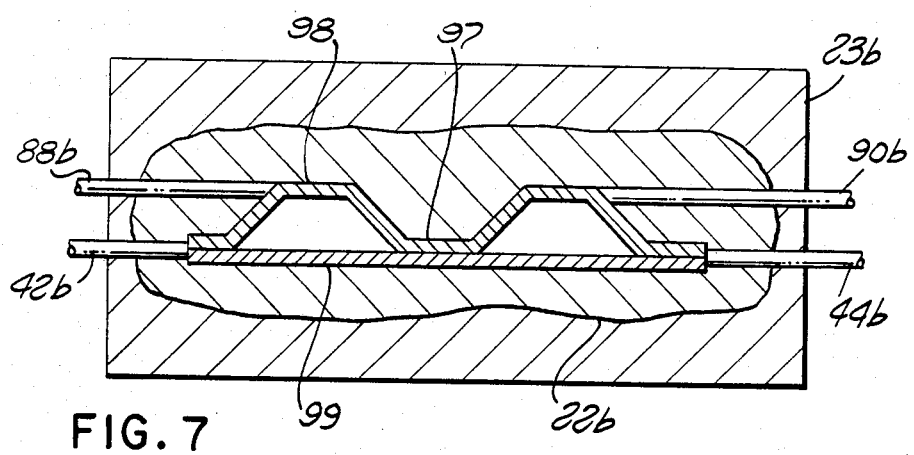

Illustrated in FIG. 7 is a cross-sectional view of a metallic structure, having only one outer surface superplastically formed, enclosed within a reinforced cast mold.

Figure 8:
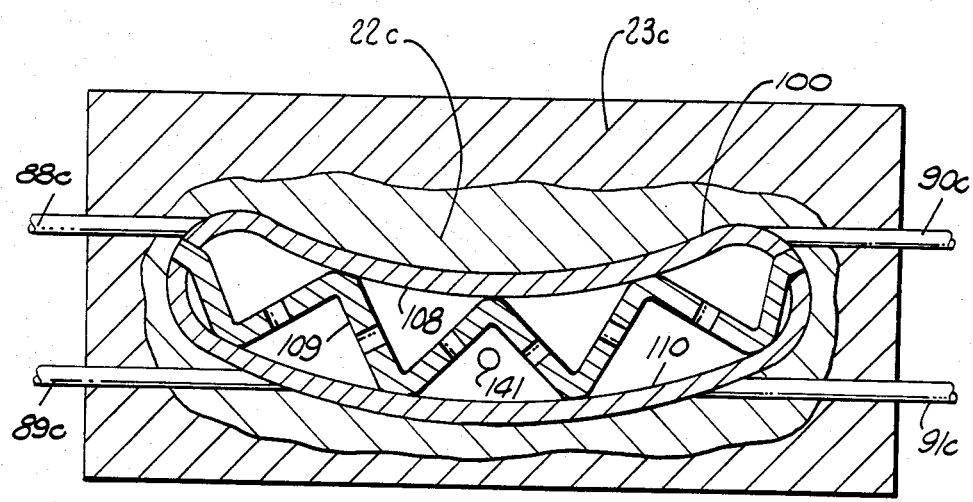

Illustrated in FIG. 8 is a cross-sectional view of a metallic sandwich structure having a curved configuration enclosed within a reinforced cast mold.

Figure 1:
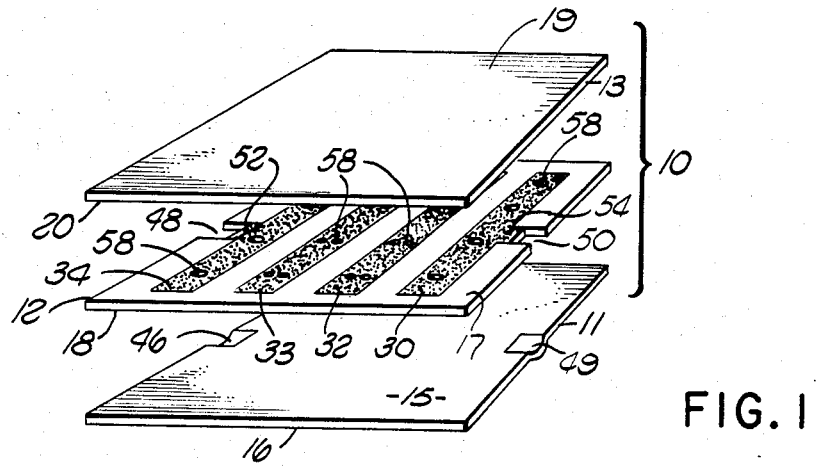
Figure 2:
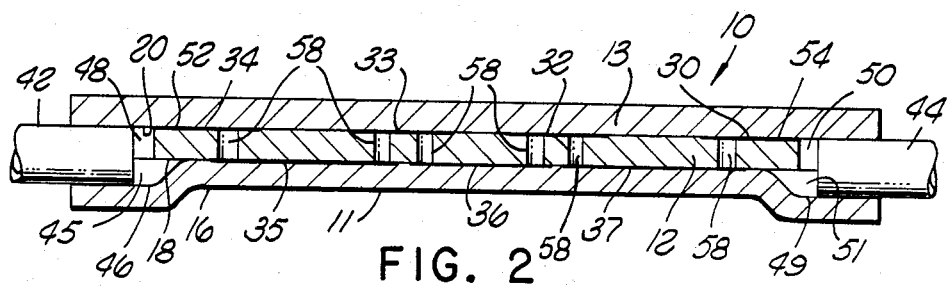
Figure 9:
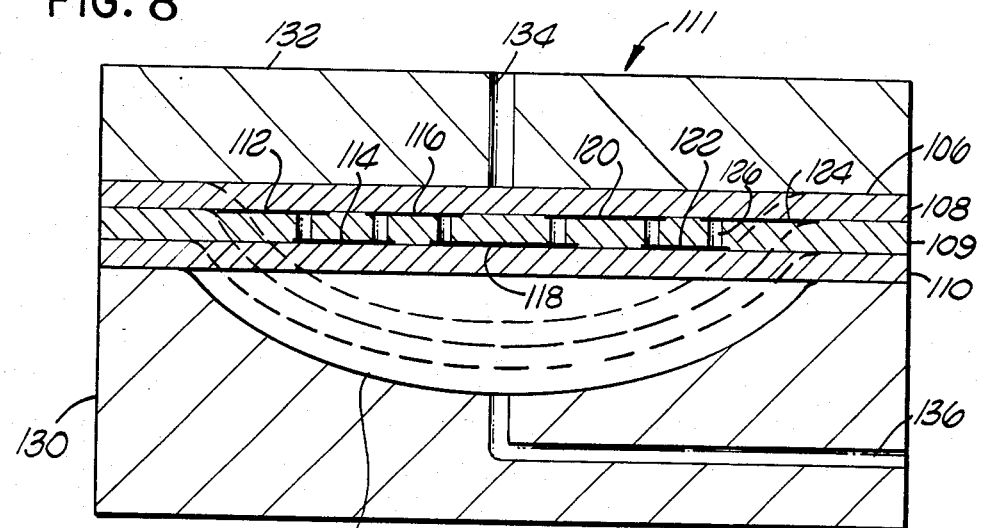

Illustrated in FIG. 9 is a cross-sectional view of a stack, similar to that shown in FIGS. 1 and 2, mounted within a die assembly for superplastic forming and diffusion bonding.

Figure 10:
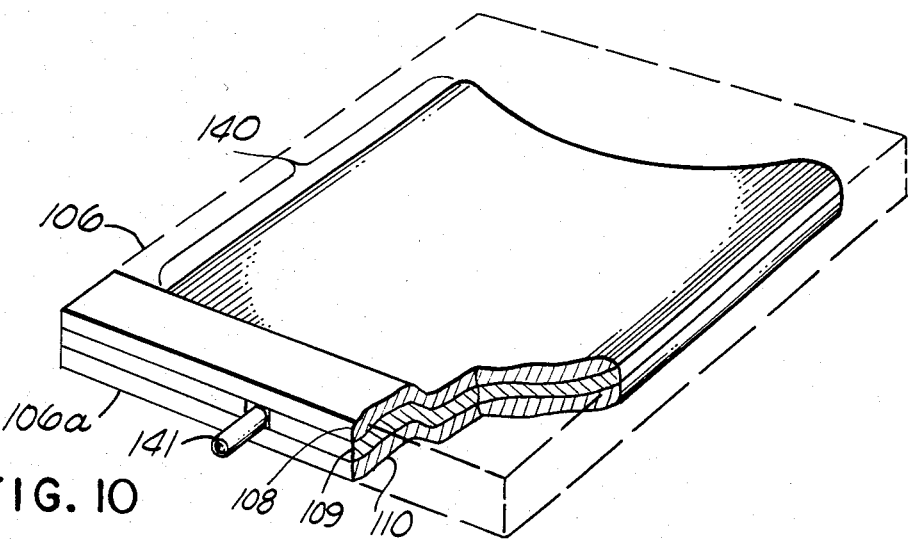

Illustrated in FIG. 10 is a perspective view, partially broken away, of the stack shown in FIG. 9, formed to the curvature of the lower die shown in FIG. 9.

DESCRIPTION OF PREFERRED EMBODIMENTS

Illustrated in FIG. 1 is an exploded perspective view of a three-piece metal blank stack 10 which is to be formed into a sandwich structure according to the present invention. FIG. 2 illustrates the three-piece metal blank stack 10. The stack 10 is made up of metal blanks 11, 12, and 13, which are preferably in the form of sheets having upper and lower opposed principal surfaces 15 and 16, 17 and 18, and 19 and 20, respectively. The number of sheets used will vary depending upon load conditions and design requirements. However, a minimum of two sheets must be utilized and normally three or more sheets would be used. The metal sheets must have the ability to be joined by such methods as brazing, welding, or diffusion bonding. Depending upon the number of sheets to be expanded, at least one of the sheets must have an effective strain rate sensitivity, i.e., exhibit superplastic properties at forming temperatures.

Any metal that exhibits superplastic properties within a workable temperature range can be used for such sheets, but the present invention is particularly concerned with metals that exhibit superplastic properties within the temperature range required for diffusion bonding; for example, titanium or alloys thereof, such as Ti-6Al-4V.

Illustrated in FIG. 5 is a completed metallic sandwich structure 21, enclosed in its forming mold 22, reinforced with ceramic reinforcement 23. It can be seen that the completed sandwich structure 21 has blank 12 joined at selected locations to both blanks 13 and 11. Referring back to FIGS. 1 and 2, in order to only join at the selected locations on the blanks, a preferred procedure is to apply a suitable stop-off material to those areas within the stack 10 where no attachment or joining between the sheets is desired. Thus, areas 30, 32, 33, and 34 on surface 17 and areas 35, 36, and 37 on surface 18, of the blank 12 are coated with a stop-off material to prevent bonding in those areas. A preferred stop-off material is Yttria ($Y_2O_3$), which can be applied by spraying, painting or silk screening techniques.

The prior methods of superplastic forming and diffusion bonding used dies machined from high-temperature resistant alloys. But such dies are expensive to manufacture and their use in the making of prototype structures or for short production runs may be uneconomical. On the other hand, in the instant method, only inexpensive dies are required.

For expansion of the stack 10 to the configuration shown in FIG. 5, hollow inflation tubes 42 and 44 are provided as shown in FIG. 2. The tube 42 is positioned between blanks 11 and 13 and protrudes into a channel 45 defined by recess 46 in blank 11, notch 48 in blank 12 and that portion of surface 20 of blank 13 which overlies notch 48. Recess 49, and notch 50 on the opposite ends of blanks 11 and 12, respectively, along with that portion of surface 20 overlapping notch 50 form channel 51 for the tube 44. A coating path 52 is provided to couple tube 42 to area 34, and a coating path 54 is provided to couple tube 44 to area 30. A plurality of apertures 58 are provided in blank 12 to interconnect the areas 30, 32, 33, and 34 on surface 17 and areas 35, 36, and 37 on surface 18 of the blank 12. Alternately, additional stop-off paths can be provided to obtain the required interconnection. To hold the stack 10 together during subsequent forming operations, the stack is usually tack-welded or spot-welded together at a sufficient number of points to ensure that they remain properly assembled. The blanks 11, 12 and 13 are then diffusion bonded together in the uncoated areas by conventional press or gas diffusion bonding processes well known in the art.

Illustrated in FIG. 3 is a previously formed mold 60 in which the bonded stack 10 has been placed. The mold 60, comprises mold halves 62 and 64, having cavities 66 and 68, respectively. When the mold halves 62 and 64 are joined together, the cavities 66 and 68 conform to the external contour of the finished sandwich structure 21 (shown in FIG. 5). Wax, heated to a temperature where it becomes at least a viscous liquid, is pumped into the cavities 66 and 68 via tubes 74 and 76, in the mold halves 62 or 64, respectively, until said cavities are filled. Tubes 78 and 79 are provided for venting entrapped air from the cavities 66 and 68 ensuring that they are completely filled. The wax is then allowed to cool to room temperature and solidify, forming inserts 80, after which the mold halves 60 and 64 are split apart. Most all waxes suitable for use in investment casting processes are usable.

Furthermore, instead of wax, a liquid plastic could be injected and cured. Alternately, the inserts 80 could be formed separately and thereafter bonded to the bonded stack 10 eliminating the need for the mold 60.

Illustrated in FIG. 4 is the bonded stack 10 and inserts 80 within a cast mold 22. The mold 22 is preferably formed by repeatedly dipping the bonded stack 10 and inserts 80 into a ceramic slurry containing a binder material such as ethyl silicate followed by dipping into a fluidized bed containing granular particles of a ceramic material such as silicon dioxide ($SiO_2$), forming a coating thereon. This coating is then allowed to cure. These steps are repeated until a sufficient thickness is achieved, after which the coating is allowed to fully cure. The sufficiency of the thickness depends upon the strength of the ceramic material and the pressures required during forming. Passageways 82, 83, 84, and 85 are then drilled from the exterior of the mold 22 to the inserts 80. Into these holes are inserted pipes 88, 89, 90, and 91, respectively. The mold 22 is then heated until the inserts 80 liquidfy. The liquidified wax is then flowed out of the mold 22 through tubes 88–91. Alternately the passageways 82–85 could be formed by attaching small diameter wax rods to the inserts 80 prior to forming the mold 22. These rods would also liquidfy when the mold 22 was heated. If plastic inserts had been used, the mold 22 would be heated to a temperature where the plastic would be vaporized. At this point superplastic forming of the bonded stack 10 can take place, but it is a usual procedure to reinforce the mold 22.

Referring to FIG. 5, it can be seen that the mold 22 has been reinforced with additional ceramic reinforcement 23. The usual procedure for making the reinforcement 23 is to place the mold 22 in a container (not shown) and pour in a slurry of ceramic material and letting it cure.

As previously stated, superplastic forming and diffusion bonding is carried out per the method disclosed in U.S. Pat. No. 3,927,817, Method of Making Metallic Structures, by Hamilton, et al., and need not be discussed in detail. But simply put, the mold 22 is heated to a temperature where the stack 10 is at superplastic forming temperatures. Thereafter fluid pressure is applied to tubes 42 and 44, causing blanks 11, 12, and 13 to superplastically form to the sandwich structure 21. During forming, any entrapped gas between the bonded stack 10 and the mold 22 escapes through tubes 88–91. Alternately, to aid in forming a vacuum can be drawn through tubes 88–91. Thereafter, the internal pressure and temperature are returned to ambient and the mold 22 and reinforcement 23 are broken away from the completed sandwich structure 21.

Illustrated in FIG. 6 is an alternate sandwich structure 92. Here, only the blanks 93 and 94 are superplastically formed, i.e., expanded, and, thus, must exhibit superplastic properties. Blank 95 need not be of a material that exhibits superplastic properties but it must be capable of being diffusion bonded to the blank 94. The mold 22a is similar to mold 22 shown in FIGS. 4 and 5 and is incased in a ceramic reinforcement 23a. As in the previous case, tubes 88a and 90a are incorporated to provide a vent or in order to draw a vacuum from between the blank 93 and the mold 22a; while tubes 42a and 44a are provided in order to supply fluid pressure between the unbonded portions between blank 93, 94 and 95. The general procedure is essentially identical to that illustrated in FIGS. 1–5.

Illustrated in FIG. 7 is a sandwich structure 97 consisting of blanks 98 and 99, diffusion bonded together, within a mold 22b, similar to mold 22 shown in FIGS. 4 and 5, and incased in a ceramic reinforcement 23b. In this case, only blank 98 has been superplastically formed and, thus, must exhibit superplastic properties at forming temperatures. Blank 99 need not exhibit superplastic characteristics but it must be capable of being diffusion bonded to blank 98. As in previous examples, tubes 88b and 90b are provided to vent or allow a vacuum to be drawn from the space between blank 99 and the mold 22b; and tubes 42b and 44b are provided for supplying fluid pressure between the unbonded portions of the blanks 98 and 99. The method of manufacture is essentially identical to the method illustrated in FIGS. 1–5.

Illustrated in FIG. 8 is a cross-sectional view of a metallic sandwich structure 100 in the shape of a stator vane for a jet engine fan or compressor section. When making parts having such a complex contour, it is sometimes desirable to use a modified procedure. Illustrated in FIG. 9 is a stack 106 composed of three blanks, 108, 109, and 110 mounted within a die assembly 111. As in the previous cases, those areas which are to remain unbonded are coated with a stop-off. In this case, these areas are 112, 114, 116, 118, 120, 122, and 124 of the blank 109. These coated areas are interconnected with passages 126 in blank 109.

It has been found that sandwich structure 100, shown in FIG. 8, can be easily formed if the stack 106 is first formed to the general curvature of the vane 100. This is readily accomplished by superplastic forming the stack 106. Preferably, the step of superplastic forming is accomplished by using the procedure as set forth in U.S. Pat. No. 3,934,441, "Controlled Environment Superplastic Forming of Metals," by Hamilton, et al. In this case, however, a multiple number of blanks are formed instead of just one blank as set forth by Hamilton, et al., but the process is the same. The process is fully described in the referenced application and need not be discussed in detail here. Suffice it to say, the stack 106 is placed on top of a die member 103 of the die assembly 111 and clamped in place by a cap 132. Pressure is applied to the stack 106 through port 134 in the cap 132 while port 136 in die member 130 is vented to atmosphere. Alternately, a vacuum could be drawn from between the stack 106 and die member 130 increasing the effective pressure on the stack 106. The pressure and temperature are applied until the part takes on the contour of the cavity 137 of the die member 130. The blanks 108, 109, and 110 will be simultaneously diffusion bonded at the selected locations during the superplastic forming of the stack 106 if the pressure temperature, and duration of application are suitable therefor.

Alternately, blanks 108, 109, and 110 may be subsequently diffusion bonded at the selected locations such as when the bonding requires the pressure to be set at a different level than that required for superplastic forming.

Illustrated in FIG. 10 is a stack 106a with a portion 140 trimmed to the dimensions of the sandwich structure 100, as shown in FIG. 8. Trimming can be accomplished by conventional machining methods such as milling. The stack 106, originally illustrated in FIG. 9, is shown both in solid and dotted lines for comparison purposes. Note that a tube 141 is incorporated which connects to at least one of the areas coated with a stop-off compound so that the portion 140 can be subsequently expanded.

The subsequent forming steps are similar to those previously discussed. The trimmed and curved stack 106a is placed in a mold having an internal cavity complimentary to the exterior contour of the sandwich structure 100 shown in FIG. 8. Liquidified wax is injected, and solidified to form the inserts after which the mold is removed. The stack 106a, with inserts, is then coated with silicon dioxide in the manner previously described, until a mold 22c of proper thickness is achieved. Preferably, a ceramic reinforcement 23c is added. The trimmed portion 140 of the stack 106a is then superplastically formed to the cross-section of the sandwich structure 100, shown in FIG. 8, by applying pressure through tube 141 and either venting or drawing a vacuum through tube 88c–91c.

Referring again to FIG. 5, an alternate method for making the structure 21 is to accomplish the step of diffusion bonding after the mold 22 has been cast about the stack 10 and the inserts 80 have been removed, but prior to the step of superplastic forming. This is accomplished by heating the mold 22 to diffusion bonding temperature and applying fluid pressure via tubes 88–91, while venting tubes 42 and 44, causing blanks 11, 12 and 13 to bond in the untreated areas. Additionally, a vacuum can be drawn on tubes 42 and 44 which will aid the bonding process. After bonding, the pressure is released and the step of superplastic forming previously discussed, is accomplished. This method can also be applied to the structure shown in FIGS. 6 and 7.

The method will require that care be exercised to insure that no wax enters into the stack 10 during the forming of the inserts 80 or mold 22. Additionally, since the fluid pressure reacts against the mold 22, the mold should be reinforced.

While the low-cost method of making superplastically formed and diffusion bonded structures has been described with reference to particular embodiments, it should be understood that such embodiments are merely illustrative as there are numerous variations and modifications which may be made by those skilled in the art. Thus, the invention is to be construed as being limited only by the spirit and scope of the appended claims.

Therefore we claim:

1. A method of making a metallic structure comprising:
    providing a plurality of metal blank workpieces, each of said workpieces having two opposed principal surfaces, at least one of said workpieces having superplastic characteristics;
    treating said workpieces at selected areas to prevent bonding at those areas;
    positioning said workpieces in a stack, contacting at their principal surfaces, at least one of the outer workpieces of said stack having superplastic characteristics;
    diffusion bonding said stack together in the untreated areas;
    coupling at least one insert to said stack, such that said at least one insert and said bonded stack conform to the external configuration of said structure;
    casting a mold about said at least one insert and said stack;
    removing said at least one insert from said cast mold; and
    expanding by superplastic forming at least one of said workpieces having superplastic characteristics against said cast mold to form said structure.

2. The method of claim 1 wherein said structure has a curvature and also including the step of superplastically forming said stack to a curvature substantially equal to said curvature of said structure.

3. The method of claim 2 wherein the step of superplastically forming said stack to a curvature is accomplished substantially with the step of diffusion bonding.

4. The method of claim 1 or 2 or 3 wherein the step of coupling at least one insert comprises:
    enclosing said stack in a formed mold having an internal cavity complementary to the external configuration of said structure;
    flowing a liquid into said mold, filling the space between said stack and said cavity;
    solidifying said liquid forming said at least one insert; and
    removing said formed mold from about said at least one insert and said stack.

5. The method of claim 4 wherein said liquid is a wax heated to a liquid state; and the step of solidifying said liquid comprises cooling said liquid to about room temperature; and
the step of removing said at least one insert from said cast mold comprises:
heating said at least one insert to a temperature where it liquifies; and
withdrawing said liquid insert from said cast mold.

6. The method of claim 1 or 2 or 3 wherein said at least one of said workpieces having superplastic characteristics is a titanium alloy.

7. The method of claim 1 or 2 or 3 wherein said treatment comprises coating said selected areas with a stop-off compound.

8. The method of claim 7 wherein said stop-off compound is Yttria.

9. The method of claim 1 or 2 or 3 wherein the step of casting a mold comprises:
    dipping said stacked workpieces and said at least one insert in and out of a ceramic slurry containing a binder;
    dipping said stacked workpieces and said at least one insert in and out of a fluidized bed of ceramic material such that a coating is formed thereon;
    curing said coating on said workpieces and said at least one insert; and
    repeating said dipping and curing steps until the desired thickness of said mold is achieved.

10. The method of claim 9 wherein said binder is ethyl silicate and said ceramic material is silicon dioxide.

11. The method of claim 1 wherein the step of treating said workpieces comprises coating said selected areas with a stop-off compound;
    the step of coupling at least one insert comprises:
    enclosing said stack in a formed mold having an internal cavity complimentary to the external configuration of said structure;
    flowing a liquid into said mold, filling the space between said stack and said cavity;
    solidifying said liquid forming said at least one insert; and
    removing said formed mold from about said at least one insert and said stack; and
    the step of casting a mold comprises:
    dipping said stacked workpieces and said at least one insert in and out of a ceramic slurry containing a binder;
    dipping said stacked workpieces and said at least one insert in and out of a fluidized bed of ceramic material forming a coating thereon;
    curing said coating on said workpieces and said at least one insert; and
    repeating said dipping and curing steps until the desired thickness of said mold is achieved.

12. The method of claim 9 also including the steps of:
    pouring a ceramic slurry around said cast mold; and
    curing said poured ceramic slurry to form a reinforcement mold around said cast mold.

13. The method of claim 1 or 11 also including the steps of:
    pouring a ceramic slurry around said cast mold; and
    curing said poured ceramic slurry to form a reinforcement mold around said cast mold.

14. The method of claim 1 wherein said casting step is performed such that said mold has sufficient strength to withstand said expanding step.

15. The method of claim 9 wherein said casting step is performed such that said mold has sufficient strength to withstand said expanding step.

* * * * *